United States Patent
Wood

(10) Patent No.: US 12,460,135 B2
(45) Date of Patent: Nov. 4, 2025

(54) SYSTEM COMPRISING A NEMATIC LIQUID CRYSTAL AND AN INTERFACE

(71) Applicant: The University Court of the University of Edinburgh, Edinburgh (GB)

(72) Inventor: Tiffany Wood, Edinburgh (GB)

(73) Assignee: The University Court of the University of Edinburgh, Edinburgh (GB)

( * ) Notice: Subject to any disclaimer, the term of this patent is extended or adjusted under 35 U.S.C. 154(b) by 0 days.

(21) Appl. No.: 18/549,164

(22) PCT Filed: Apr. 28, 2022

(86) PCT No.: PCT/GB2022/051088
§ 371 (c)(1),
(2) Date: Sep. 5, 2023

(87) PCT Pub. No.: WO2022/238678
PCT Pub. Date: Nov. 17, 2022

(65) Prior Publication Data
US 2024/0158696 A1    May 16, 2024

(30) Foreign Application Priority Data
May 11, 2021 (GB) ....................... 2106704

(51) Int. Cl.
*G02F 1/1333* (2006.01)
*B82Y 40/00* (2011.01)
*C09K 19/54* (2006.01)
*C09K 19/52* (2006.01)

(52) U.S. Cl.
CPC ............ *C09K 19/544* (2013.01); *B82Y 40/00* (2013.01); *C09K 2019/526* (2013.01)

(58) Field of Classification Search
CPC .... C09K 19/52; C09K 19/526; C09K 19/544; G02F 1/1333
See application file for complete search history.

(56) References Cited

U.S. PATENT DOCUMENTS 8,801,964 B2 *  8/2014  Chen ................. G02F 1/133703
                                                 252/299.5
2024/0158696 A1 *  5/2024  Wood ..................... B82Y 40/00

FOREIGN PATENT DOCUMENTS

WO    WO-2020/254813 A1    12/2020

OTHER PUBLICATIONS

"Interface." Merriam-Webster.com Dictionary, Merriam-Webster, https://www.merriam-webster.com/dictionary/interface. Accessed Nov. 5, 2024. (Year: 2024).*
PCT International Prelim. Report on Patentability dated Nov. 23, 2023 in International Application No. PCT/GB2022/051088.
PCT International Search Report and Written Opinion dated Jul. 22, 2022 in International Application No. PCT/GB2022/051088.
Search Report dated Feb. 11, 2022 in UK Application No. GB 2106704.6.

* cited by examiner

*Primary Examiner* — Geraldina Visconti
(74) *Attorney, Agent, or Firm* — Foley & Lardner LLP

(57) ABSTRACT

A system comprising: a nematic liquid crystal, and at least one interface in contact with the nematic liquid crystal, wherein the interface comprises a first interface region on one side of the nematic liquid crystal and a second interface region on another side of the nematic liquid crystal, the interface comprising nucleation sites to form defect lines in the nematic liquid crystal extending across the nematic liquid crystal from the first interface region to the second interface region.

18 Claims, 7 Drawing Sheets

SYSTEM COMPRISING A NEMATIC LIQUID CRYSTAL AND AN INTERFACE

CROSS-REFERENCE TO RELATED APPLICATIONS

This application is a U.S. National Stage Patent Application under 35 U.S.C. § 371 of International PCT Patent Application PCT/GB2022/051088, filed Apr. 28, 2022, which claims priority to United Kingdom Patent Application No. 2106704.6 filed on May 11, 2021 both of which are incorporated herein by reference in their entireties.

TECHNICAL FIELD

Described examples relate to a system comprising a nematic liquid crystal and at least one interface in contact with the nematic liquid crystal, as well as to a method for forming such a system. Described examples also relate to a gel comprising the nematic liquid crystal.

BACKGROUND

Liquid crystals are a state of matter which have properties somewhere between those of conventional liquids and those of solid crystals. Liquid crystals exhibit a phase transition under different conditions. Thermotropic liquid crystals exhibit a phase transition as temperature is changed and do not require a solvent. Lyotropic liquid crystals exhibit phase transitions as a function of both temperature and concentration of the liquid crystal molecules in a solvent. Lyotropic liquid crystals form a variety of mesophases including nematic, chiral nematic, lamellar and cubic phases. Thermotropic liquid crystals form a variety of mesophases including nematic, chiral nematic, smectic, and more complex phases.

For the lyotropic case, the solvent can be water (or at least 80% water), hydrocarbon (or at least 80% hydrocarbon), organic oil (or at least 80% organic oil) or silicone oil (or at least 80% silicone oil).

A common liquid crystal phase is the nematic. Nematic phases have no positional order, but have long-range orientational order. Mesogens (i.e. a compound which is capable of forming a liquid crystal) which can form a nematic phase are known as nematogens. Nematogens are anisotropic, that is one axis has a different length than the other two. Lyotropic nematic phases can be formed when the aspect ratio is greater than 3. The same rule applies for thermotropic nematic phases—except for a thermotropic liquid crystal only molecular mesogens are relevant. The aspect ratio of a calamatic nematogen is generally defined as the length of the longest axis divided by the length of the shortest axis. Other types of nematic phase exist including discotic and biaxial.

Nematogens are rod-shaped in a calamatic phase and disk-shaped in a discotic or chromonic phase. The orientation of long-range order is known as the director. The director of a region of a nematic liquid crystal is the average direction in which the molecules are oriented within that local region. The director is along the long axis of nematogens for the calamatic phase and along the short axis of nematogens for the discotic or chromonic phase.

Nematic mesogens may align with some chirality thus generating a chiral nematic phase. The pitch length is the distance over which the orientation of the nematogens has completed one full rotation through the liquid crystal.

A lyotropic nematic phase may be formed by anisotropic colloids, anisotropic micelles or anisotropic molecules in a solvent. A thermotropic nematic phases may be formed by anisotropic molecules, but no solvent.

Anisotropic colloids forming a nematic state are suspended within a liquid continuous phase. The long axis is between 1 nanometer and 1 micron. They may be organic or inorganic. Anisotropic colloids include clays, talcs, cellulose nanocrystals, carbon nanotubes, graphene, nanotubes formed from dipeptides, fairly rigid polymers (e.g. hydroxypropylcellulose) or large proteins. Anisotropic micelles forming a nematic state are formed by a mixture of more than one type of amphiphilic molecule, often called a surfactant and co-surfactant. Amphiphilic molecules have both hydrophilic and hydrophobic parts and can aggregate in a solvent to form micelles such that the outside of the micelle is soluble in the solvent. Amphiphiles may include proteins, surfactants, lipids, fatty acids, glycolipids and amphiphilic nanocolloids.

Anisotropic molecules can be inflexible or semi-flexible polymers (e.g. hydroxypropylcellulose or proteins) or can include the class of chromonic lyotropic liquid crystalline phases. Chromonic compounds refers to large multi-ring molecules typically characterized by the presence of a hydrophobic core, containing aromatic or non-aromatic rings, surrounded by various hydrophilic groups and dispersed in a liquid continuous phase. Chromonic compounds include folic acid, disodium 6-hydroxy-5-[(4-sulfophenyl)azo]-2-naphthalenesulfonate (i.e. Sunset Yellow) or disodium cromolyn.

Anisotropic molecules do not need to be polymeric. For many thermotropic liquid crystals they are not polymeric (aspect ratio only >1:3), unless they are liquid crystal polymers. Anisotropic molecules can be any molecules with an aspect ratio >1:3. They can be cyanobiphenyls (or other thermotropic liquid crystals used in display technology). They can be used without a solvent (thermotropic) or with a solvent (lyotropic).

Occasionally, the director of the nematic changes abruptly and this creates a defect which can take the form of a point or line. A defect line is also known as a disclination. Defects can be nucleated by a surface where the nematic director changes orientation and may be nucleated through a chemical discontinuity or physical shape incompatible with uniform alignment of the director.

Dispersed colloids can nucleate a variety of defect points or lines within a liquid crystal. Weak, normal anchoring of nematogens on a colloid surface is known to generate a defect with quadrupolar symmetry that creates a defect line, called a Saturn-ring defect, that encircles each particle. Weak anchoring is defined as when the generalised Frank elastic constant of the liquid crystal is greater than the dispersed colloid radius multiplied by the anchoring strength of the nematogen. A Saturn-ring disclination can also connect to disclinations generated through other means.

Thermotropic nematic liquid crystals comprising colloids which form entangled defect lines (known as disclinations) spanning the colloid are described in *Science,* 334 (6052) 79-83 (2011) (T. A. Wood et al), which is herein incorporated by reference.

A gel comprising a colloid dispersed in a lyotropic nematic liquid crystal, the lyotropic nematic liquid crystal comprising defect lines formed by the colloid is disclosed in PCT application WO2020254813 (A1) "Defect mediated lyotropic nematic gel", which is herein incorporated by reference.

Impurities within a nematic phase are strongly attracted to and become trapped within defects and defect lines within a liquid crystal. These may be colloids or molecules.

It may be desirable to provide a system and method that overcomes or mitigates one or more problems associated with the prior art.

SUMMARY

In accordance with a first aspect of the present invention, there is provided a system comprising: a nematic liquid crystal, and at least one interface in contact with the nematic liquid crystal, wherein the interface comprises a first interface region on one side of the nematic liquid crystal and a second interface region on another side of the nematic liquid crystal, the interface comprising nucleation sites to form defect lines in the nematic liquid crystal extending across the nematic liquid crystal from the first interface region to the second interface region.

In embodiments, anything that disrupts the alignment of the nematic liquid crystal at the interface will create a nucleation site.

The nematic liquid crystal may comprise chiral nematic phases, for example with a pitch length greater than 5 microns.

The nematic liquid crystal may be at least partially enclosed by the interface.

The nematic liquid crystal may be bound by the interface.

The interface may comprise an at least partially solid substrate and wherein the nucleation sites may comprise an array of nucleation structures on a surface of the substrate, wherein the defect lines may be pinned to the nucleation structures.

This may control the density of the defect lines between the substrates.

Mechanical properties (e.g. storage modulus, viscosity, relaxation times) may be determined by the number of defect lines percolating across a gap between the substrates, which may be based on the density of nucleation sites on the surface.

The storage modulus $G'=T/(dnet)^2$, where T is the line tension of the defect line and dnet is the average separation distance between the defect lines. The line tension T of the defect lines may be ~10 to 200 pN or ~10 to 100 pN.

The nucleation structures may be in a random array or may be in a regular array.

The spacing between adjacent nucleation structures in the array of nucleation structures may be in a range of greater than the coherence length of the nematic liquid crystal and less than 50 microns. The coherence length may be defined as 10 times the long dimension of the nematogen.

This may be considered to be a rough surface.

Spacing between adjacent nucleation structures in the array of nucleation structures may be in a range of greater than 10 times the coherence length of the nematic liquid crystal and less than 50 microns.

The spacing d between adjacent nucleation structures may be either the same as the separation between defect lines or half the separation between defect lines (each colloid may give rise to two defect lines).

The width of the nucleation structures in the array of nucleation structures may be greater than the nematic coherence length and less than the separation between nucleation structures.

The height of the nucleation structures may be greater than one molecule providing the surface alignment layer and there may be no specific limit on the height of the nucleation structures. The height of the nucleation structures may be from tens of nanometres to tens of microns.

The surface of the substrate may be at least one of chemical patterned, spin coated, colloidal coated, particle coated, printed, mechanically roughened, sandblasted metal, smooth, vinyl coated, machined, and cross hatched metal.

The chemical patterning may create regions of homeotropic anchoring next to planar anchoring—which may be flat.

1 micron diameter particles in the particle coated surface create an average separation distance between defect lines of the order of ~0.5 microns to ~1 micron. In other words, a colloid of radius r may create an average separation distance between disclinations between r/2 and r. This may provide a storage modulus of ~300 Pa.

This may provide a storage modulus of ~300 Pa.

For the particle coated surface, it may be any kind of particle from the size of the coherence length of the nematic liquid crystal up to 50 microns.

In general, the average separation distance may be down to a size comparable with the nematic coherence length and may depend on the size of nanoparticle used.

The sandblasted metal surface may provide an average separation distance between defect lines of ~10 microns. A mechanically roughened surface (e.g. sandblasting) may create a surface with disparities of the order of 5 to 20 in size, e.g. 1 to 100 microns etc depending on the method of mechanical roughening. This may provide a storage modulus of ~3 Pa.

The vinyl coated surface may provide an average separation distance between defect lines of ~100 microns. This may provide a storage modulus of <0.01 Pa. The vinyl coated surface is an example of a smooth surface. Even a smooth surface may generate an average separation distance of 100 microns but this is not sufficient to provide gel like properties because G'<G".

The cross hatched metal surface may provide an average separation distance between defect lines of 50 microns or greater. This may provide a storage modulus of ~0.01 Pa. The cross-hatched metal surface is an example of a machined surface. Another machine surfaced may have been machined to have smaller 'teeth', e.g. in a range of 0.5 micron and up to 100 microns.

The interface may comprise a fluid including particles, wherein the nucleation sites comprise the particles.

The fluid may be gas or liquid or semi-solid. The gas may be air.

A fluid may be considered to be a substance that flows, therefore viscoelastic or slowly moving gels or glasses may be considered to be fluids that are semi-solid. Whether they exhibit solid-like or liquid-like behaviour may depend on the time scale of measurement. Many surfactants form lamellar structures at interfaces (that can be considered semi-solid).

The system may be configured to be used as a sensor based on the number of particles incident at the interface over time.

The first interface region and the second interface region may be different, e.g. different fluids, or a fluid and a solid. One of the first interface region and the second interface region may be solid with the other of the first interface region and the second interface region being a fluid.

The distance between the first interface region and the second interface region may be in a range of the nematic coherence length to 200 microns. The coherence length may be be defined as 10 times the long dimension of the nematogen. For a pure nematic filling the space between the first interface region and the second interface region, the limit in terms of the distance between them may be 200 microns. It may not be limited to this distance if it was filled with a nematic gel with colloids suspended within at a volume fraction >20%.

The system may comprise a colloid dispersed within the nematic liquid crystal.

This may have an advantage that the defect lines may span the distance between the one side of the interface to the other side of the interface (i.e. the distance between the first interface region and the second interface region) when the distance is greater than 200 microns. The defect lines may span the nematic liquid crystal when it is thicker than 200 microns. This may be because the colloids generate defect lines within the bulk of the nematic liquid crystal.

The system may be configured to transmit stress in a range of 0.1 to $10^5$ Pa.

The system may be configured to provide stress transmission with temporal control by modifying the interface to change the number of nucleation sites in a particular area.

The temporal control may be in seconds. The temporal control may be very fast, over the order of milliseconds or very long, over the course of hours or days. However the response of the gel structure to a change at the interface may occur within seconds, with the majority of the response complete within a minute but some slow structural change may occur up to an hour.

The number of nucleation sites may be changed (e.g. decreased) in a particular area through manipulating (e.g. stretching) a flexible substrate.

The number of nucleation sites may be changed (e.g. increased) in a particular are by modifying (e.g. adding to) the number of particles in a fluid interface.

The first interface region and the second interface region may be integral. The first interface region and the second interface region may not be separate components. The first interface region and the second interface region may form a single continuous interface. The interface may be circular, elliptical, spherical, torus or any other suitable shape.

The first interface region and the second interface region may be separate components.

The first interface region and the second interface region may be not integral with each other.

The system may be configured to transmit stress with a resolution for an average separation distance of the defect lines of between $1e^{-8}$ $m^2$ to $1e^{-15}$ $m^2$.

The defect lines may be configured to create an assembly of nanowires of between $10^8$ to $10^{15}$ nanowires per $m^2$. The nanowire may be made of metal. The nanowire may comprise polymer nanowires. This may be filled with monomer and then cured to create polymer wires or hairs.

This may provide conductivity for coatings and other advanced materials.

The defect lines may be configured to organise nanoparticles and molecules.

This may prevent undesirable phase separation and improve efficiency (e.g. estimated four fold efficiency improvement).

The defect lines may be used for at least one of template porous channels, template nanohairs, creating anisotropic conductive adhesives or inks, a bonding lubricant between the substrates, diffusion channels, delivering soluble ingredients, directing the delivery of cargo across substrates, cell growth, optimizing composite structures, self-levelling paint, adaptive cushioning, haptic touch, a robotic grip to control stress provided to an object to be gripped, inks that form homogeneous drops and organic solar cells.

The bonding lubricant may be stable. The delivering of soluble ingredients may be possible since diffusion occurs more quickly in the defect lines core than the bulk of the gel. The system may be provided with a range of oil-soluble and water-soluble materials.

The cargo may be any non-nematic dispersed material in the nematic liquid crystal.

The nematic liquid crystal may be at least one of: oil based, a thermotropic liquid crystal, anisotropic colloids in an organic solvent, water based, anisotropic colloids in water based solutions, lyotropic chromonic liquid crystals and surfactant mixtures forming nematic phases.

The anisotropic colloids in an oil solvent may be clay particles.

The anisotropic colloids in water based solutions may be cellulose nanocrystals.

In accordance with a second aspect of the present invention, there is provided a gel comprising a nematic liquid crystal, the nematic liquid crystal comprising defect lines formed, in use, by at least one interface in contact with the nematic liquid crystal, wherein the interface comprises a first interface region on one side of the nematic liquid crystal and a second interface region on another side of the nematic liquid crystal, the defect lines extending across the nematic liquid crystal from the first interface region to the second interface region between nucleation sites of the interface.

The gel may be a material with a storage modulus greater than a loss modulus.

The gel may have a storage modulus as measured by oscillatory rheology of 0.1-5 Pa.

The gel may have a storage modulus of $10^3$ Pa when an average distance between neighbouring defects is <50 microns for substrates with a separation of 5-200 microns.

The gel may have a storage modulus of $10^5$ Pa when an average distance between neighbouring defects is <1 mm for substrates with a separation of 10-100 nm.

The gel may have a shear thinning index n of 0-40. The gel may have a shear thinning index n of 0<n<0.4. The gel may have a shear thinning index n of 0<n<0.25.

The nematic liquid crystal may be at least one of a thermotropic nematic liquid crystal, a lyotropic nematic liquid crystal, a liquid crystal polymer, a thermotropic liquid crystal polymer, and a lyotropic liquid crystal polymer.

The nematic liquid crystal may comprise a nematogen dissolved or suspended in a liquid.

In accordance with a third aspect of the present invention, there is provided a method for making a system as described above, the method comprising the steps of: (a) providing a nematic liquid crystal, and (b) providing at least one interface to be in contact with the nematic liquid crystal, wherein the interface comprises a first interface region on one side of the nematic liquid crystal and a second interface region on another side of the nematic liquid crystal, the interface comprising nucleation sites to form defect lines in the nematic crystal extending across the nematic liquid crystal from the first interface region to the second interface region.

The interface may comprise an at least partially solid substrate, the method may further comprise the step of: providing a surface of the substrate having nucleation structures, wherein the defect lines are pinned to nucleation structures.

The method may further comprise at least one of the steps of: (a) roughing the surface of the substrate to provide the nucleation structures; (b) chemical patterning the surface of the substrate to provide the nucleation structures, and (c) providing particles onto the surface of the substrate to provide the nucleation structures.

The interface may comprise a fluid, the method may further comprise the step of: providing particles into the fluid to provide the nucleation sites.

In accordance with a fourth aspect of the present invention, there is provided a method of making a gel as described above, the method comprising the steps of: (a) selecting at least one interface and creating nucleation sites for defect lines extending across the nematic liquid crystal from the first interface region to the second interface region; and (b) filling the space between the first interface region and the second interface region with a nematic liquid crystal.

The creation of the nucleation sites of the interface may be through any means (e.g. chemical patterning, spin coating colloids, printing).

The space between the first interface region and the second interface region may be filled by the nematic liquid crystal through any means (e.g. capillary action or spreading on one surface then applying another).

The method may comprise the step of: (c) rejuvenating gel behaviour by applying shear to the nematic liquid crystal at a temperature such that a nematic liquid crystal phase is formed.

The method may comprise mixing nanoparticles or molecules, (e.g. of size range 1-500 nm) into the nematic phase at volume fractions below 5% in order to fill the defect lines.

In accordance with a fifth aspect of the present invention, there is provided a method of using the system or gel as described above for at least one of lubricants; maintaining space between the lens and cornea during cataract surgery; tailoring packaging or process surfaces in contact with a nematic phase to control flow properties; creating homogeneous coatings; paints; inks; agrochemicals; topical formulations; injection through a narrow gauge needle; enhancing delivery of useful molecules or nanoparticles, in particular for cosmetic and pharmaceutical applications; templating a 3D network of nanowires; destabilising formulations to induce phase separation and enable recovery of components for recycling and prevention for release into the environment; chemical sensor; a matrix for three dimensional growth of microorganisms; robot grip; treatment, cleaning, caring or conditioning of the person or of surfaces, furniture and atmosphere of the home and household contents and of clothes, fabrics and/or cloth fibres; adhesives; ceramics; films; sprays; gels; lotions; foams; nanowires; yarns; medical implants; wearables; bone graft material; 3D printing material; inks; agrochemical formulations; coatings; composites; energy storage materials; advanced materials; responsive composites; cosmetic products; personal care products; pharmaceuticals; and foodstuff.

BRIEF DESCRIPTION OF THE FIGURES

Embodiments of the invention will now be described, by way of example only, with reference to the accompanying schematic drawings, in which.

DESCRIPTION OF SPECIFIC EXAMPLES

Figure 1:
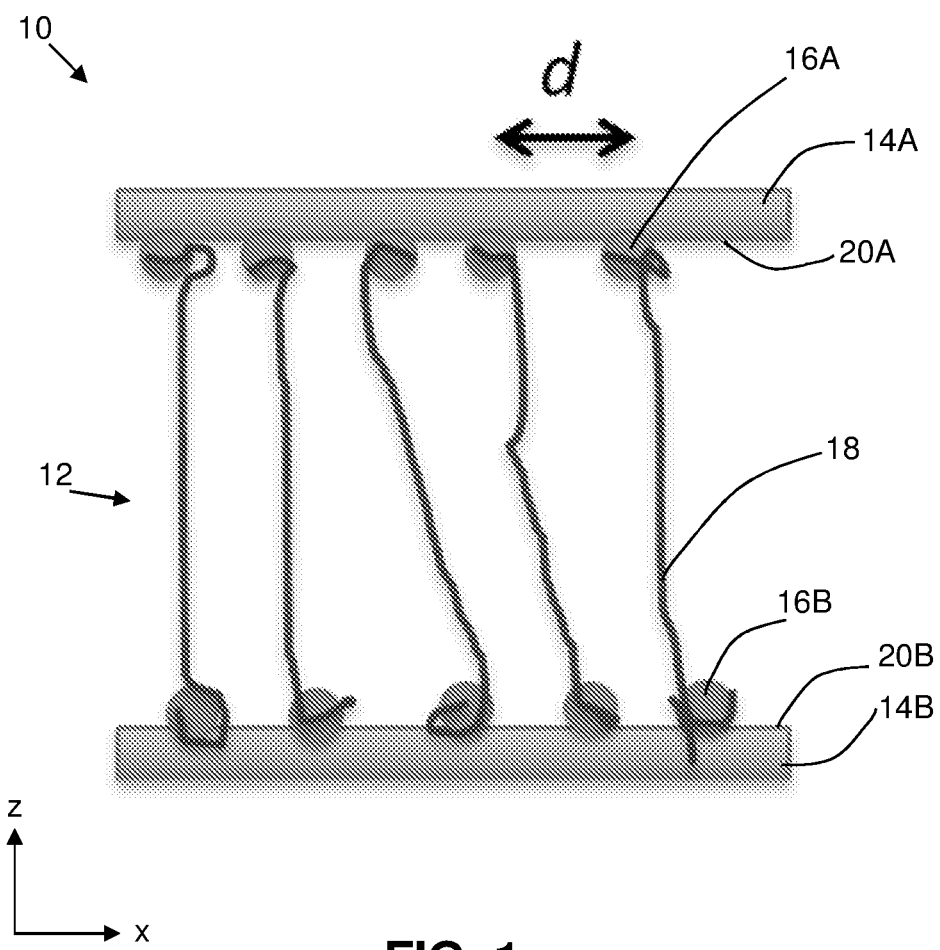
FIG. 1 shows a schematic diagram of a system of a nematic liquid crystal and two substrates according to an embodiment of the present invention.

FIG. 1 is a schematic diagram showing a system 10 comprising a nematic liquid crystal 12 (nematic) provided between two substrates 14A, 14B. That is, the two substrates 14A, 14B are in contact with the nematic 12. In this embodiment, the substrates 14A, 14B are substantially solid. The two substrates 14A, 14B may be considered to be a first interface region on one side of the nematic 12 and a second interface region another side of the nematic 12 respectively. In this embodiment, the first interface region and the second interface region are separate components (i.e. they are not integral with each other). The first interface region and the second interface region together may be considered to be an interface.

FIG. 1 shows a planar view (in an x-z plane) of the system 10. The substrates 14A, 14B may be in a substantially cuboid, cylindrical or oval in shape. The substrates 14A, 14B may have a thickness in the z direction and may extend in the x direction and extend perpendicularly to the x direction and the z direction (i.e. into and out of the page).

The substrates 14A, 14B comprise nucleation sites 16A, 16B to form defect lines 18 in the nematic 12. As shown, the defect lines 18 extend across the nematic 12 from the substrate 14A to the substrate 14B. That is, a defect line 18 extends from the nucleation site 16A on the substrate 14A to the nucleation site 16B on the substrate 14B. The defect lines 18 extend between the directly opposing substrates 14A, 14B. The defect lines 18 may extend in a straight line between the substrates 14A, 14B, although they do not need to do so (e.g. they may be at least partially curved or follow a more circuitous route). In embodiments, the distance between the substrates 14A, 14B may be equal to or less than 200 microns. The nematic 12 may be considered to be thin film.

The nucleation sites 16A, 16B may be formed in a variety of ways as will be described. However, generally, anything that disrupts the alignment of the nematic 12 at the substrate 14, 14B will create a nucleation site 16A, 16B.

The nematic 12 may be considered to be a film sandwiched between the substrates 14A, 14B, i.e. the nematic 12 may be bound by the substrates 14A, 14B. The nematic 12 may be considered to be partially enclosed by the substrates 14A, 14B. In this embodiment, there is nothing at the sides of the substrates 14A, 14B, but, in other embodiments, there may be something at the sides, i.e. it is optional.

The defect lines 18 connecting the substrates 14A, 14B generates elasticity in the nematic 12. This increase in elasticity in the nematic 12 leads to the formation of a gel. A gel may be defined as a material with a storage modulus (G') greater than the loss modulus (G"). In other words, the substrates 14A, 14B bounding the nematic 12 and having the nucleation sites 16A, 16B to form the defect lines 18 across the nematic 12 from one side of the other side generates the effect of a gel. For a nematic liquid crystal the average separation between disclinations (defect lines) increases with the distance beyond a threshold height, α, between the interfaces (e.g. substrates 14A, 14B) as $d_{net}=d_0 e^{h/\alpha}$ where $d_0$ is the average separation of disclinations below this threshold.

The elasticity in the nematic 12 may be tuned. The elasticity/storage modulus (G') is determined by the number density of defect lines 18 (disclinations) running across the nematic 12. The storage modulus $G'=T/(d_{net})^2$, where T is the line tension of the defect line and $d_{net}$ is the average separation distance between the defect lines. For example, for defect lines having $d_{net}$ of ~10 nm, the line tension T may be ~10 to 100 pN. The storage modulus is the elastic contribution to the complex modulus.

The nucleation sites 16A, 16B of the substrates 14A, 14B are formed by an array of nucleation structures on the surfaces 20A, 20B of the substrates 14A, 14B. The array may be regular or may be random. The defect lines 18 are pinned to the nucleation structures.

The spacing d between the nucleation structures is important. This may control the density of defect lines 18 between the substrates 14A, 14B. The spacing d between the nucleation structures may determine the storage modulus (G'). The spacing d (or more particularly $d_{net}$) between adjacent nucleation structures in the array of nucleation structures may be in a range of greater than 10 times the coherence length of the nematic 12 and less than 50 microns. This may be considered to be a rough surface. The surfaces 20A, 20B of the substrates 14A, 14B may be roughened in order to provide the nucleation structures that form the nucleation sites 16A, 16B.

Mechanical properties of the nematic 12 (e.g. storage modulus, loss modulus viscosity, relaxation times) may be determined by the number of defect lines 18 percolating across a gap between the substrates 14A, 14B. The loss modulus $$G'' \approx \eta\omega + \frac{2\pi K}{d_{net}^2 \gamma_0} + \left(\frac{2\pi K \gamma_r}{d_{net}^2 \gamma_0}\right)$$

where K is the Frank elastic constant of the nematic phase, η is the viscosity of the liquid crystal at high shear rate, $\gamma_r$. The number of defect lines 18 (or density of defect lines 18) may be based on the density of nucleation structures on the surfaces 20A, 20B of the substrates 14A, 14B. The density of defect lines will decay beyond a critical shear rate $$\dot{\gamma} = \omega\gamma_0 \approx \frac{2\pi K}{d_{net}^2 \gamma_r},$$

The nucleation structures may be formed in a variety of ways. For example, one or both of the surfaces 20A, 20B of the substrates 14A, 14B may be at least one of chemical patterned, spin coated, colloidal coated, particle coated, printed, sandblasted metal, vinyl coated, and cross hatched metal. The chemical patterning may create regions of homeotropic anchoring next to planar anchoring—which may be flat. The nucleation structures should give rise to defect lines, not point defects.

The width of the nucleation structures should be greater than the nematic coherence length and less than the separation between nucleation structures. The height of the nucleation structures should be greater than one molecule providing the surface alignment layer and there may be no specific limit on the height of the nucleation structure.

For the particle coated example, it may be any kind of particle from a size of the coherence length of the nematic 12 up to 50 microns. It will be appreciated that the surfaces 20A, 20B of the substrates 14A, 14B detailed above are just examples and there may be other types of surfaces. More generally, there may be particles, patterned substrates and roughened substrates to cover all range of topologies from the nematic coherence length to 50 microns.

The defect lines 18 transmit stress between the substrates 14A, 14B. Stress is the force transmitted per unit area. Controlling the density of the defect lines 18 through controlling the density of nucleation structures means that the stress between the substrates 14A, 14B can be controlled. Previously, the spatial resolution of applying stress between substrates may have been limited by lithographic or printing techniques, (e.g. around $1e^{-12}$ m$^2$). However, the system 10 of FIG. 1 allows stress to be transmitted over relatively very small areas, at resolutions down to $1e^{-15}$ m$^2$. That is, the system 10 may be configured to transmit stress with a resolution for an average separation distance of the defect lines 18 of up to $1e^{-15}$ m$^2$. Having different nucleation structures in different areas allows spatial control of transmitted stress (e.g. varying from 0.1 to $10^5$ Pa) with submicron pattern resolution. A defect line, pinned by discontinuities on opposing sides, can extend over large distances (~250 microns) through a nematic phase.

Figure 2:
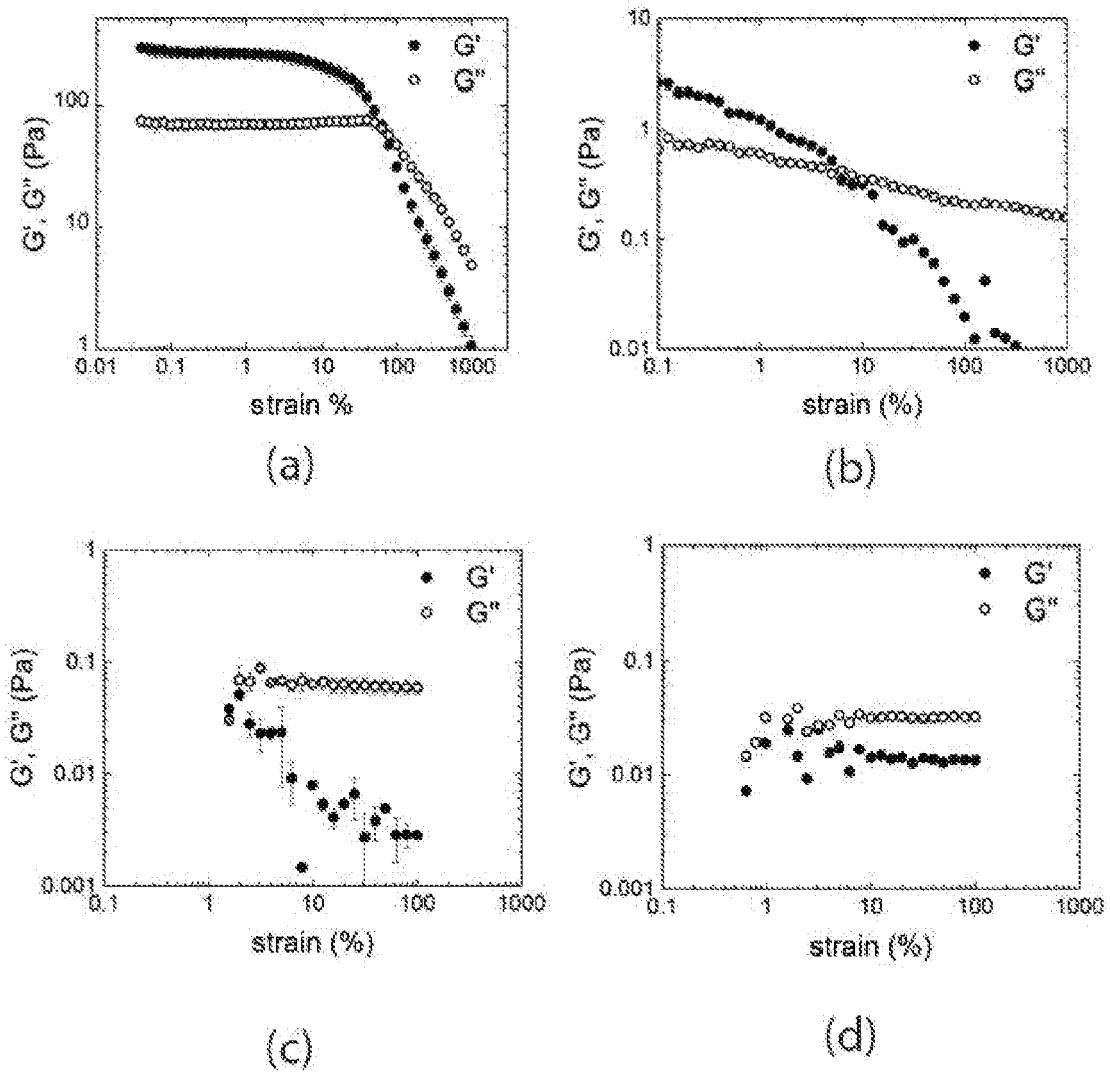
FIGS. 2(a)-2(d) show graphs of the storage modulus (G') and loss modulus (G"), with respect to strain % for thermotropic nematic 4-cyano-4'pentylbiphenyl (5CB) sandwiched between some examples of surfaces of substrates according to embodiments of the present invention.

FIGS. 2(*a*)-2(*d*) show graphs of storage modulus (G') and loss modulus (G") with respect to strain % measured using oscillatory rheology (with an applied frequency of 1 Hz) across thermotropic nematic 4-cyano-4'pentylbiphenyl (5CB) with disclination densities controlled by some examples of surfaces of the substrates. That is, 5CB sandwiched between some examples of surfaces of the substrates.

FIG. 2(*a*) shows an example of particle coated surfaces. The particle coated surface may provide an average separation distance d between defect lines of ~1 micron. As shown in the graph this may provide a storage modulus (G') of ~300 Pa, with G'>G", for a plate separation (i.e. separation between substrates) of 20 micron. The spacing d between nucleation structures may be either the same as the separation between defect lines or half the separation between defect lines (each colloid could give rise to two defect lines). It will be appreciated that these are just examples; the separation could be lower (e.g. down to a size comparable with the nematic coherence length and depends on the size of nanoparticle used).

FIG. 2(*b*) shows an example of sandblasted metal surfaces. The sandblasted metal surface may provide an average separation distance d between defect lines of ~10 micron. As shown in the graph this may provide a storage modulus (G') of ~3 Pa for a 1 degree cone-plate geometry with a truncation gap of 22 micron.

FIG. 2(*c*) shows an example of vinyl coated surfaces. The vinyl coated surface may provide an average separation distance d between defect lines of ~100 micron. As shown in the graph this may provide a storage modulus (G') of <0.01 Pa for a plate separation of 40 microns.

FIG. 2(*d*) shows an example of cross hatched metal surfaces. The cross hatched metal surface may provide an average separation distance d between defect lines of ~100 micron. As shown in the graph this may provide a storage modulus (G') of ~0.01 Pa at a plate separation of 60 micron.

Figure 3:
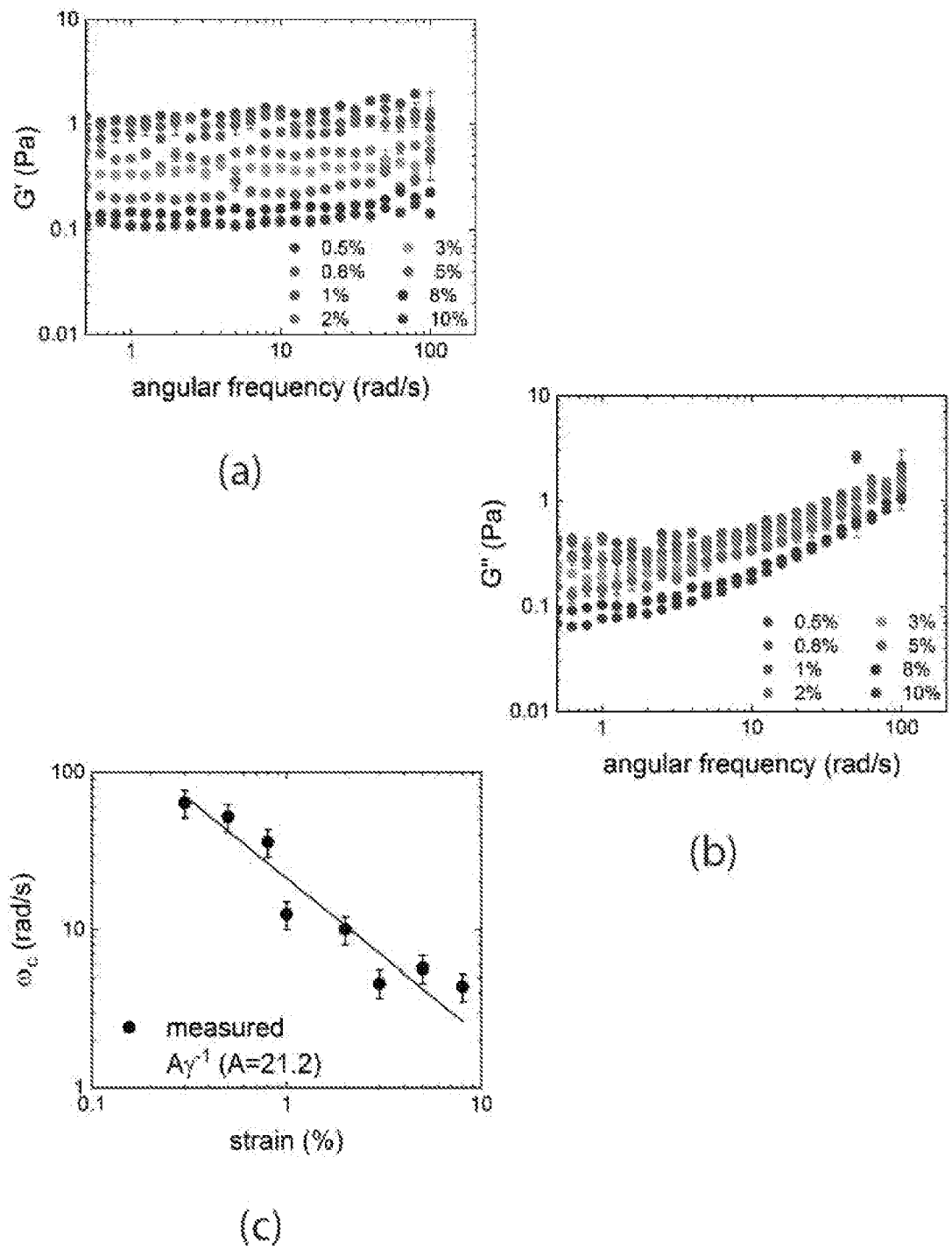
FIG. 3 shows graphs of the a) storage modulus (G') and b) loss modulus (G") with respect to the applied angular frequency ω for different amplitudes of applied strain and graph c) of critical angular frequency $\omega_c$ with respect to applied strain for opposing sandblasted metal surfaces according to embodiments of the present invention.

The critical frequency ω, at which there is a transition between solid like (G'>G") to liquid-like (G">G') behaviour is inversely proportional to the applied strain, as may be shown in FIG. 3. FIG. 3 shows graphs of the a) storage modulus (G') and b) loss modulus (G") with respect to the applied angular frequency ω for different amplitudes of applied strain between 0.5% to 10% measured through oscillatory rheology using a strain-controlled rheometer. Below the critical angular frequency $\omega_c$, the response of the gel is solid-like (G'>G") but becomes liquid-like (G">G') at frequencies above $\omega_c$. Graph 3c) shows that $\omega_c$ is inversely proportional to the applied strain. Measurements were collected for nematic 5CB within a gap of 50 microns between opposing sandblasted metal surfaces of roughness 10 microns.

Figure 4:
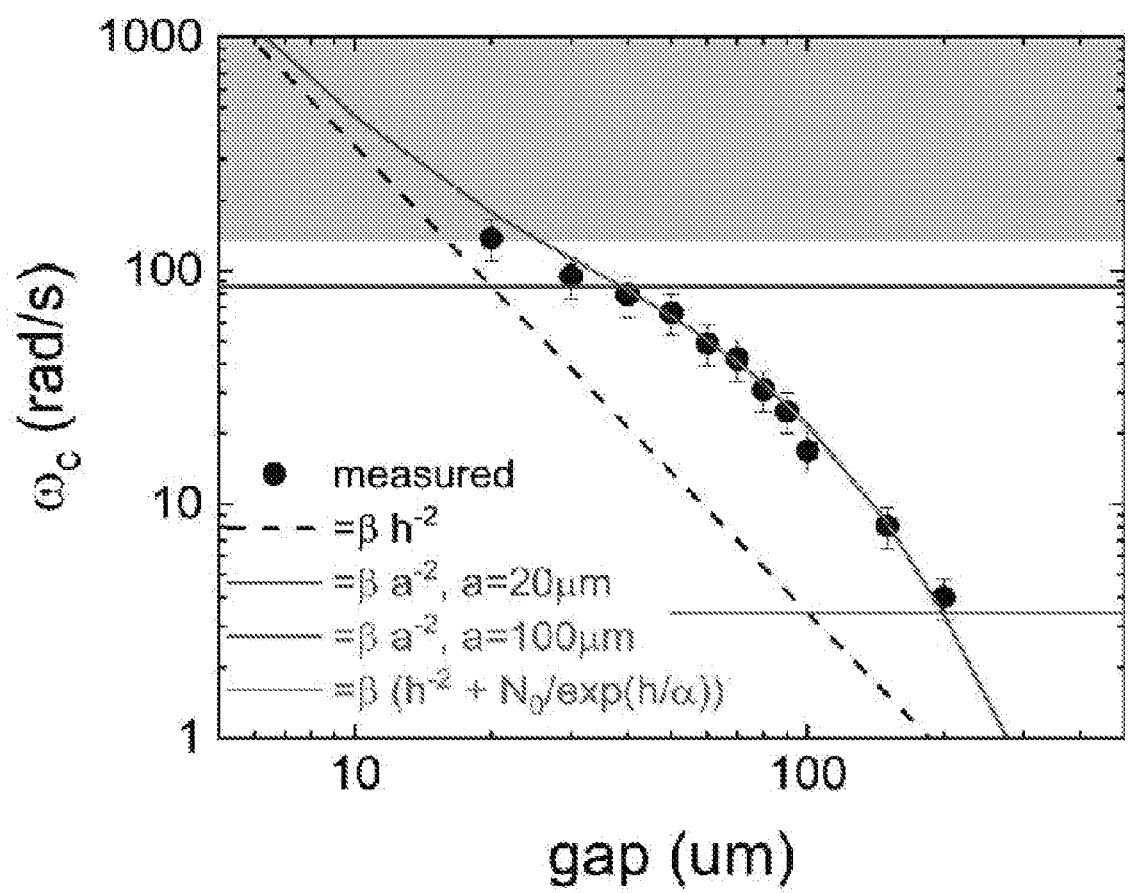
FIG. 4 shows a graph of the critical angular frequency $\omega_c$ with respect to the gap h between opposing sandblasted metal surfaces according to embodiments of the present invention.

The distance h between interfaces may affect the properties, e.g. the storage modulus, because fewer disclinations can be maintained across the entire distance within the unfilled nematic phase. The effect of distance on the critical frequency $\omega_c$, at which G" exceeds G', may be shown in FIG. 4. FIG. 4 shows a graph of the critical angular frequency $\omega_c$ with respect to the gap h across the thermotropic nematic 5CB between opposing sandblasted metal surfaces of roughness 10 microns for an applied strain of 1% and measured through oscillatory rheology using a strain-controlled rheometer. The critical frequency is not dependent on the distance h if disclinations are supported by surfaces (e.g. colloids) held between the interfaces.

In embodiments, a colloid may be dispersed within the nematic 12. This may have an advantage that the defect lines 18 may span the distance between the substrates 14A, 14B when the distance is greater than 200 microns. Thus, in embodiments, the defect lines 18 may span the nematic 12 when it is thicker than 200 microns. This may be because the colloids generate defect lines within the bulk of the nematic 12—e.g. see PCT application WO2020254813 (A1).

The dispersed colloid may be solid, liquid or gas of any material. As used herein, the dispersed colloid may have a radius between 10 nanometers and 5 micrometers. The surface chemistry of the colloid may be modified with the use of surfactants, dispersants or emulsifiers. If used with colloidal nematogens, the dispersed colloid can be larger than five times the long axis of the nematogen.

The nematogen may be selected from materials which are capable of forming anisotropic micelles, anisotropic colloids or anisotropic molecules. When the nematogen is a colloid, its longest axis is generally at least ten times smaller than that of the colloid which is dispersed in the lyotropic nematic liquid crystal.

Anisotropic micelles may be formed from amphiphilic polymers, glycolipids, lipids, fatty alcohols, surfactants, or mixtures of these. The term "fatty alcohol" is used to refer to an alcohol comprising 4-26 carbon atoms, more particularly to a straight-chain primary alcohol. More particularly, the lipid may be a mixture of dimyristoylphosphatidylcholine (DMPC) with either dihexanoylphosphatidylcholine (DHPC) or 3-(cholamidopropyl)dimethylammonio-2-hydroxy-1-propanesulfonate (CHAPSO). In particular, the fatty alcohol may be decanol and the surfactant may be sodium dodecyl sulphate (SDS). Anisotropic colloids may be formed from mineral particles. More particularly, the mineral particles may be selected from montmorillite, bentonite, talc, calcium carbonate, graphene oxide, carbon nanotubes or synthetic anisotropic colloids. Anisotropic colloids may be formed from organic material e.g. cellulose, nanocrystalline cellulose, collagen, chitin, actin, collagen, silk proteins or dipeptide structures. In particular, the nematogen may be nanocrystalline cellulose or hydroxypropylcellulose. In particular, the nanocrystalline cellulose may be modified to improve charge stabilisation, in particular with (2,2,6,6-Tetramethylpiperidin-1-yl)oxyl (TEMPO) or sulphate groups.

Anisotropic molecules may include folic acid, disodium 6-hydroxy-5-[(4-sulfophenyl)azo]-2-naphthalenesulfonate (i.e. Sunset Yellow), disodium cromolyn or dipeptides. More particularly, the anisotropic molecule may be Sunset Yellow.

In particular, the solvent may comprise water, a hydrocarbon, an organic compound (e.g. glycerol or other organic materials) or a silicone oil, more particularly water. More particularly, the solvent may be at least 80 wt % water, a hydrocarbon, an organic compound or a silicone oil, more particularly water. The weight fraction quoted here is relative to the solvent alone.

In particular, the colloid dispersed in the liquid crystal may be selected from polymer particles (including melamine particles, polymethylmethacrylate particles, polystyrene particles or biopolymer particles), inorganic oxide, silicone oil and oil. The surface of the colloids may be modified through chemical treatment, e.g. grafting of polymer, or physical treatment e.g. use of dispersants or emulsifiers. More particularly, the polymethylmethacrylate (PMMA) particles additionally comprise poly-12-hydroxy-stearic acid (PHSA) or polyvinylpyrrolidone (PVP). The PHSA and PVP can stabilise the PMMA particles. In particular, the silicone oil may be silicone oil 50 cSt or polydimethyl siloxane (PDMS). Silicone oil may be used in combination with micellar nematic phases. More particularly, the oil may be a sunflower oil. Sunflower oils may be used in combination with nanorod nematic phases. Suitably, the surface of the dispersed colloid is chemically or physically modified to promote normal anchoring of nematogens e.g. polymethylmethacrylate particles have poly-12-hydroxy-stearic acid or polyvinylpyrrolidone grafted to the surface, or emulsion droplets of silicone oil are stabilised with sodium dodecyl sulphate.

Particular combinations of lyotropic nematic liquid crystals and colloids include (i) Sunset Yellow with particles comprising PMMA or PMMA and PVP, (ii) Sunset Yellow with melamine particles, (iii) decanol and SDS with particles comprising PMMA or PMMA and PVP, (iv) decanol and SDS with anionic polystyrene, (v) decanol and SDS with cationic polystyrene, (vi) cellulose, more particularly nanocrystalline cellulose, optionally modified with TEMPO, with particles comprising PMMA or PMMA and PVP. In all of these cases, the solvent comprises water.

Some of the above examples relate to the dispersion of colloids in the liquid crystal but it will be appreciated that, in other embodiments, there may not be a colloid dispersed in the liquid crystal. There may be a lyotropic or thermotropic nematic without dispersed colloid.

A thermotropic nematic may be formed by anisotropic molecules, with no solvent. Thermotropic nematic phases may be formed when the aspect ratio is greater than 3 (>1:3), more preferably >1:4.

The nematic liquid crystal may be liquid crystal polymers (either thermotropic or lyotropic). Some examples of liquid crystal polymers are: e.g. thermotropic (Vectra) and lyotropic (Kevlar), Poly(3-hexylthiophene) in trichlorobenzene solution and hydroxypropylcellulose in water.

In embodiments, one or more of the substrates 14A, 14B may be flexible. The substrates 14A, 14B may be stretchable (e.g. in direction x in FIG. 1). Through stretching the flexible substrate 14A, 14B, the number of nucleation structures may be changed (e.g. decreased) in a particular area (i.e. the number density of the nucleation structures may be change (e.g. decreased). This modification of the substrates 14A, 14B to change the number of nucleation structures in a particular area may allow stress transmission with temporal control. That is, over time, one or more of the substrates 14A, 14B may be modified to change the stress transmitted between the substrates 14A, 14B. This is because changing the density of nucleation structures will change the density of defect lines which in turn change the stress transmitted. The temporal control may be in seconds (i.e. the stress may be changed in seconds). It will be appreciated that the substrates may be manipulated in other ways to change the number of nucleation structures in a particular area, e.g. the substrates may be compressed to increase the number density of the nucleation structures.

In embodiments, the defect lines 18 may create an assembly of nanowires. The system 10 may be arranged to create an assembly of nanowires at up to $10^{15}$ nanowires per $m^2$. This may provide conductivity for coatings and other advanced materials, such as electronic inks and adhesives, and electrodes for organic solar cells.

The defect lines 18 may organise nanoparticles or molecules. This may prevent undesirable phase separation and improve efficiency (e.g. estimated four fold efficiency improvement with respect to organic solar panels). Without careful design, if colloids are dispersed in a liquid crystal polymer or nematic then cluster formation is likely. Templating disclinatinons between interfaces ensures that the colloids or molecules are trapped within the disclinations thus forming strings of colloids or molecules. Monomers may also be templated within the disclinations and then cross-linking could be activated to create polymer hairs.

The defect lines may be used for at least one of template porous channels, template nanohairs, creating anisotropic conductive adhesives or inks, a bonding lubricant between the substrates, diffusion channels, delivering soluble ingredients, directing the delivery of cargo across substrates, cell growth, optimizing composite structures, self-levelling paint, adaptive cushioning, haptic touch, a robotic grip to control stress provided to an object to be gripped, inks that form homogeneous drops and organic solar cells.

The bonding lubricant may be stable. The delivering of soluble ingredients may be possible since diffusion occurs more quickly in the defect lines 18 core than the bulk of the gel. The system 10 may be provided with a range of oil-soluble and water-soluble materials. A nematic phase can be oil based, e.g. thermotropic liquid crystal or anisotropic colloids (e.g. clay particles) in an oil solvent. Alternatively, it can be water based e.g. anisotropic colloids (e.g. cellulose nanocrystals) in water based solutions, lyotropic chromonic liquid crystals or surfactant mixtures forming nematic phases. Alternatively, the solvent may be an organic compound including an alcohol or amine. The cargo may be any non-nematic dispersed material in the nematic 12. This is because small molecules diffuse more quickly through disclinations (defect lines) than through the nematic phase.

Figure 5:
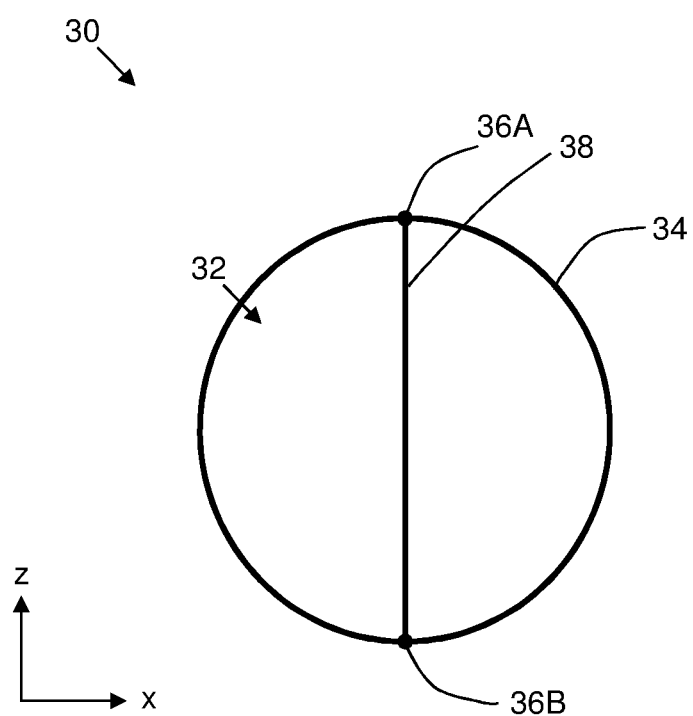
FIG. 5 shows a schematic diagram of a system of a nematic liquid crystal and an interface according to an embodiment of the present invention.

FIG. 5 shows another embodiment of a system 30. In this embodiment, the system 30 includes a nematic liquid crystal 32 (nematic) provided between a first interface region and a second interface region in a similar way to the system 10 of FIG. 1. However, in this embodiment, the first interface region and the second interface region are integral (i.e. they are not separate components). That is, they form a single continuous circular interface 34. In this case, the interface 34 encloses the nematic 32 (at least wrt the x-z plane). In this embodiment, the interface is circular but it will be appreciated that, in other embodiments, it may take a different shape (e.g. elliptical, spherical, torus).

Similarly as with the system 10 of FIG. 1, the interface 34 is in contact with the nematic 32. The interface 34 comprises nucleation sites 36A, 36B to form a defect line 38 in the nematic 32. As shown, the defect line 38 extends from the nucleation site 36A to the nucleation site 36B on the interface 34. That is, the defect line 38 extends across the nematic 32 from the first interface region to the second interface region of the interface 34. Although only two nucleation sites 36A, 36B are shown here for clarity, it will be appreciated that more than two nucleation sites (a plurality of pairs of nucleation sites 36A, 36A) may be provided (and in practice will be provided). Similarly, although only one defect line 38 is shown here for clarity, it will be appreciated that a plurality of defect lines may be provided (and in practice will be provided) and the defect lines may not be straight and may join across any chord.

Figure 6:
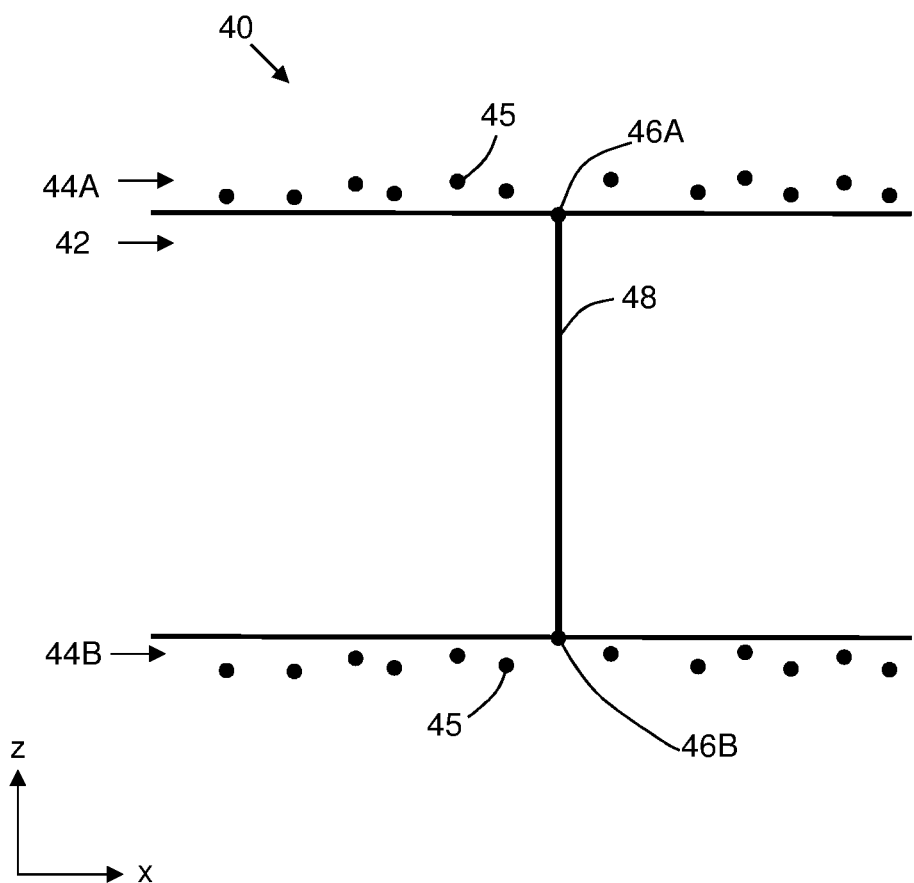
FIG. 6 shows a schematic diagram of a system of a nematic liquid crystal and two fluid interfaces according to an embodiment of the present invention.

FIG. 6 shows another embodiment of a system 40. In this embodiment, the system 40 includes a nematic liquid crystal 42 (nematic) provided between a first interface region and a second interface region in a similar way to the system 10 of FIG. 1. However, in this embodiment, the first interface region and the second interface region comprise a fluid 44A and a fluid 44B respectively. It will be appreciated that, in embodiments, these may be the same fluid (e.g. there may be a single interface enclosing the nematic 42) or different fluids (e.g. which are separated from each other). The fluids 44A, 44B include particles 45, with the particles 45 forming the nucleation sites 46A, 46B when they are in contact with the nematic 42. Any particles 45 in a liquid are likely to become stuck at the interface (i.e. when they come into contact with the nematic 42) once they have diffused there, this is a common phenomenon and has also been observed for large molecules, e.g. proteins. Once at the interface they can nucleate the disclination (not before). It will be appreciated that, in other embodiments, the first interface region and the second interface region may be different, e.g. different fluids, or a fluid and a solid.

In embodiments, one or more of the fluids 44A, 44B may be gas or liquid or semi-solid. For example, the gas may be air. It will be appreciated that, in embodiments, one of the first interface region and the second interface region may be solid with the other of the first interface region and the second interface region being a fluid, for example, a gas (e.g. air) or a liquid. The interface may be stabilised through amphiphilic molecules.

In embodiments, one or more of the particles 45 may be a molecules or aggregates of molecules (e.g. surfactants or polymers) or may be colloids (that may be solid or semi-solid).

An interface (e.g. the first interface region of fluid 44A) may be modified to change the number of nucleation sites 46A in a particular area. For example, an air interface may be loaded with particles 45 so that the number of nucleation sites 46A may change (i.e. increase) and thereby change the number of defect lines 18 (disclinations) spanning the nematic 42 film. More generally, the number of nucleation sites 46A may be changed (e.g. increased) in a particular area by modifying (e.g. adding to) the number of particles in the fluid interface. Since defect lines 18 change the stress transmitted this could be used to change the stress transmitted over time.

As an example, the second interface region 44B may be set up so that it would nucleate disclinations (e.g. it may be a solid substrate or a fluid). However, these disclinations will not connect to the other side (i.e. the first interface region 44A) if it is simply a clean interface (with homogenous alignment). However, once a particle lands on the first interface region 44A, it will generate a disclination line that can connect with nucleation sites on the other side (i.e. the second interface region 44B). As the density of disclinations increases, the optical properties of the nematic 42 film will become opaque.

The system 40 may be configured to be used as a sensor based on the number of particles incident at the interface over time. A pure nematic-air interface would not nucleate disclinations (defect lines) because the nematic director would nucleate homotropic anchoring at the interface. However, particulates (particles) falling on the air interface would nucleate disclinations, which would scatter light and the film would become more opaque. Particles can be strongly absorbed onto liquid interfaces (see Pickering emulsions). This same effect may occur with a liquid-nematic interface.

Figure 7:
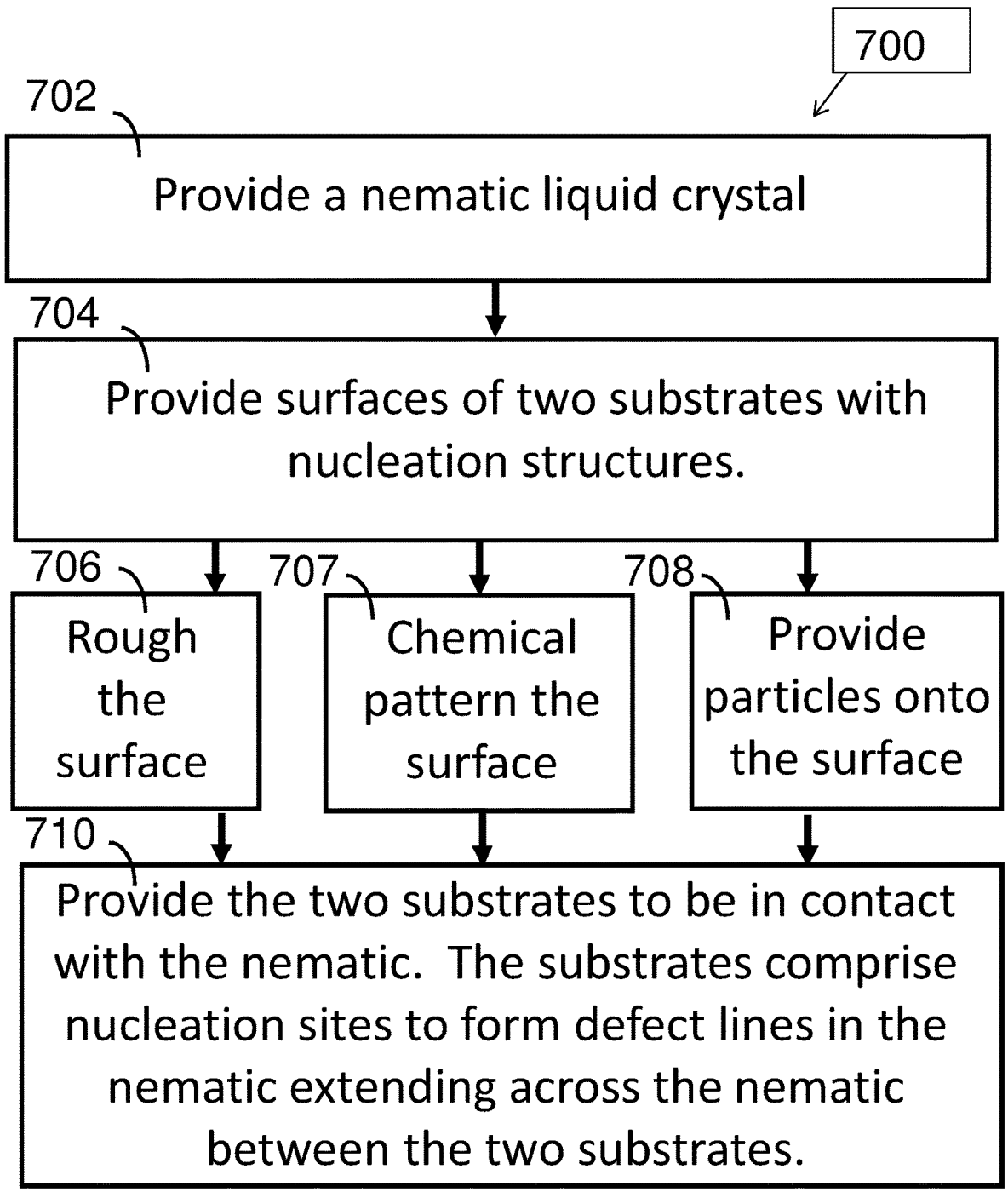
FIG. 7 shows a flowchart of a method of making a system according to an embodiment of the present invention.

FIG. 7 discloses a flow chart of a method 700 of making the system 10 of FIG. 1. In step 702, a nematic liquid crystal 12 (nematic) is provided.

In step 704, surfaces 20A, 20B of two substrates 14A, 14B are provided with nucleation structures. The nucleation structures are configured such that defect lines 18 may be pinned to the nucleation structures.

In step 706, the surfaces 20A, 20B of the two substrates 14A, 14B are roughed to provide the nucleation structures.

Alternatively, in step 707, the surfaces 20A, 20B of the two substrates 14A, 14B are chemical patterned to provide the nucleation structures.

Alternatively, in step 708, particles are provided onto the surfaces 20A, 20B of the two substrates 14A, 14B to provide the nucleation structures. It will be appreciated that, in other embodiments, other methods of providing the nucleation structures may be used.

In step 710, the two substrates 14A, 14B are provided to be in contact with the nematic 12. The substrates 14A, 14B comprise nucleation sites 16A, 16B to form defect lines 18 in the nematic 12 extending across the nematic 12 between the two substrates 14A, 14B. The nucleation sites 16A, 16B comprise the nucleation structures.

More generally, an interface is provided to be in contact with the nematic. The interface comprises a first interface region on one side of the nematic and a second interface region on another side of the nematic. The interface comprises nucleation sites to form defect lines in the nematic extending across the nematic from the first interface region to the second interface region.

It will be appreciated that there may be other methods to form the system. For example, to form the system 40 of FIG. 6 (i.e. where the interface comprises a fluid), the method may comprise provide particles into the fluid to provide the nucleation sites.

A method of making a gel may comprise the steps of (a) selecting at least one interface and creating nucleation sites for defect lines extending across the nematic liquid crystal from the first interface region to the second interface region, and (b) filling the space between the first interface region and the second interface region with a nematic liquid crystal.

The creation of the nucleation sites of the interface may be through any means (e.g. chemical patterning, spin coating colloids, printing).

The space between the first interface region and the second interface region may be filled by the nematic liquid crystal through any means (e.g. capillary action or spreading on one surface then applying another).

Although not needed for preparing the gel, if rejuvenation of the gel is required, then there may be an additional step (c) rejuvenating gel behaviour by applying shear to the nematic liquid crystal at a temperature such that a nematic liquid crystal phase is formed.

A gel may be considered to be a material with a storage modulus greater than a loss modulus. The gel comprises a nematic liquid crystal. The nematic liquid crystal may be at least one of a thermotropic nematic liquid crystal, a lyotropic nematic liquid crystal, a liquid crystal polymer, a thermotropic liquid crystal polymer, and a lyotropic liquid crystal polymer. The nematic liquid crystal may comprise a nematogen dissolved or suspended in a liquid.

The nematic liquid crystal comprises defect lines formed, in use, by at least one interface in contact with the nematic liquid crystal. The interface comprises a first interface region on one side of the nematic liquid crystal and a second interface region on another side of the nematic liquid crystal. The defect lines extend across the nematic liquid crystal from the first interface region to the second interface region between nucleation sites of the interface.

The gel may have a storage modulus as measured by oscillatory rheology of $0.1$-$10^5$ Pa. As an example, the gel may have a storage modulus of $10^3$ Pa when an average distance between neighbouring defects is <50 microns for substrates with a separation of 5-200 microns. Another example is that the gel may have a storage modulus of $10^5$ Pa when an average distance between neighbouring defects is <1 mm for substrates with a separation of 10-100 nm.

By convention, the viscosity of a shear thinning fluid is described by $\eta = \dot{\gamma}^{(n-1)}$ where $\dot{\gamma}$ is the shear rate and n is the exponent. For the gel $0 < n < 0.25$. For reference, for emulsions $n \sim 0.5$ and for polymer solutions $0.33 < n < 0.5$. Therefore, the gels provide superior sensory performance and lubrication. In embodiments, the gel may have a shear thinning index n in a range of 0-40.

The system as described above may generate disclinations (defect lines) from an interface to span a nematic liquid crystal. This may form a gel (i.e. a disclination gel). Its applications for formulations and composites useable across sectors are described. It has several technical advantages:

The gels have a high storage modulus tuned from 1 to $10^5$ Pa through the number of disclinations spanning a nematic liquid crystal.

The gels are exceptionally shear-thinning. By convention, the viscosity of a shear thinning fluid is described by $\eta = \dot{\gamma}^{(n-1)}$ where $\dot{\gamma}$ is the shear rate and n is the exponent. For gels $0 < n < 0.4$ or more specifically $0 < n < 0.25$. For emulsions $n \sim 0.5$ and for polymer solutions $0.33 < n < 0.5$. Therefore, the gels provide superior sensory performance and lubrication and in combination with tuning of the storage modulus are ideal for drilling fluid, inks and paints.

The gels can be destroyed by shear or electric or magnetic field and then self-heal. The disclinations regenerate at low, or zero strains, allowing the modulus of the gel to recover. In polymer gels cross-links are often unable to re-form.

Space-spanning disclinations can be used to self-assemble nanoparticles and large molecules into string-like structures spanning a composite to avoid non-percolating structures due to phase separation (coalescence or spinodal decomposition).

Space-spanning disclination allow diffusion and transport of small molecules from one surface to another since they can be carried at a fast rate through the disclination core (close to the rate in the isotropic phase) when compared to the nematic background.

Application: Formulations with Highly Shear Thinning Performance

Disclination gels can be almost perfectly shear-thinning such that the viscosity is almost inversely proportional with the shear rate until the viscosity of the nematic is reached. Design of the substrate in combination with a suitable nematic phase for an application could be made to create lubricants.

Application: Cohesive, Yet Removable, Gels That Maintain Space

Since the disclination gel will not stick to smooth surfaces, the gel is particularly suitable for insertion in spaces where it is required to maintain space (through having a high storage modulus) but should not bond to a surface and should be sufficiently cohesive so that it can be removed in one go. Examples include:

Gels required to maintain space between the lens and cornea during cataract surgery. If the gel can be designed so that the cornea and lens surface do not promote disclinations within the gel, then it can be injected easily (through shear thinning at high shear) and then removed intact using a lower shear rate.

Application: Uniform Distribution of Particles Upon Drying

Disclinations can resist phase separation to create a homogenous dispersion. Disclination gels typically have a storage modulus in excess of 10 Pa. This is sufficient to prevent the migration of colloids during the drying of a suspension and subsequent compression. Therefore, disclination gels are very suitable for creating homogeneous coatings. Examples include paints,
inks,
agrochemicals, and
topical formulations Application: Applications Requiring Good Injectability and Solidification in Use The gel may have a high modulus yet is still highly shear thinning so that it can be injected through a narrow gauge needle. It recovers its original storage modulus within one minute. This composite could be used for:

Application: Directed Diffusion or Driven Motion (Along Disclinations).

Disclinations are isotropic at their core which means that diffusion is much faster through disclinations than through the surrounding nematic phase. Since disclinations are cylindrical in shape, diffusion occurs in one dimension and can be biased to flow in one direction through a gradient, e.g. absorption or an osmotic gradient. This property can be used to enhance the delivery of useful molecules or nanoparticles across the composite, in particular for cosmetic and pharmaceutical applications Application: Template 3D Networks of Nanowires There may be a 3D network of disclinations through the composite. The infusion of polymer molecules or nanoparticles through the disclination network could be used to template a 3D network of nanowires. Once solidified through a mechanism e.g. Van der Waals attractions, polymerisation or sintering, the nematic fluid can be removed through dilution or heating to the isotropic phase allowing for removal through aspiration or fluid flow.

Example Applications

Destabilisation of formulations to induce phase separation and enable recovery of components for recycling and prevention for release into the environment.

Tailoring the surfaces of packaging or substrates within manufacturing plants to control the flow properties of a formulation (based on a nematic phase)

Chemical sensor—adhesivity or conductivity is lost when particular chemicals are in the environment. A matrix for three dimensional growth of microorganisms.

Robot grip—modulation of material stiffness is essential for interfacing hard materials with soft materials. This is a challenge in the field of robotics. An adaptive disclination gel lends itself to this application where the stress exerted on an object is modulated by the number of disclinations promoted by the robot.

In addition, this invention relates to compositions, products or combinations thereof relating to or having use of application in the products for the treatment, cleaning, caring or conditioning of the person or of surfaces, furniture and atmosphere of the home and household contents and of clothes, fabrics and/or cloth fibres. It includes adhesives, lubricants, ceramics, films, sprays, gels, lotions, foams, nanowires, yarns, medical implants, wearables, bone graft material, 3D printing material, inks, agrochemical formulations, topical formulations, paints, coatings, composites, energy storage materials, advanced materials, responsive composites, cosmetic products, personal care products, pharmaceuticals, foodstuff comprising the gel as described above.

The skilled person will be able to envisage further embodiments of the disclosure without departing from the scope of the appended claims.

The invention claimed is:

1. A system comprising:
a nematic liquid crystal, and an interface in contact with the nematic liquid crystal, wherein the interface comprises a first interface region on one side of the nematic liquid crystal and a second interface region on another side of the nematic liquid crystal, the interface comprising nucleation sites for disrupting alignment of the nematic liquid crystal at the interface to form defect lines in the nematic liquid crystal extending across the nematic liquid crystal from the first interface region to the second interface region.

2. The system of claim 1, wherein the interface comprises a solid substrate and wherein the nucleation sites comprise an array of nucleation structures on a surface of the substrate, wherein the defect lines are pinned to the nucleation structures.

3. The system of claim 2, wherein spacing between adjacent nucleation structures in the array of nucleation structures is in a range of coherence length of the nematic liquid crystal to 50 microns.

4. The system of claim 2, wherein the width of the nucleation structures in the array of nucleation structures is greater than nematic coherence length and less than separation between nucleation structures.

5. The system of claim 1, wherein the interface comprises a fluid including particles, wherein the nucleation sites comprise the particles.

6. The system of claim 5, wherein the system is configured to be a sensor based on the number of particles incident at the interface.

7. The system of claim 1, wherein one or more of:
the distance between the first interface region and the second interface region is equal to or less than 200 microns;
the system comprises a colloid dispersed within the nematic liquid crystal; and/or the first interface region and the second interface region are separate components.

8. The system of claim 1, wherein the system further comprises a processor configured to:
   transmit stress in a range of 0.1 to $10^5$ Pa;
   provide stress transmission with temporal control by modifying the interface to change the number of nucleation sites in a particular area; and/or
   transmit stress with a resolution for an average separation distance of the defect lines of up to $1e^{-15}$ m$^2$.

9. The system of claim 1, wherein the defect lines are configured to
   form an assembly of nanowires at up to $10^{15}$ nanowires per m$^2$; and/or
   contain nanoparticles and molecules.

10. The system of claim 1, wherein the nematic liquid crystal is at least one of: oil based, a thermotropic liquid crystal, anisotropic colloids in an organic solvent, water based, anisotropic colloids in water based solutions, lyotropic chromonic liquid crystals and surfactant mixtures forming nematic phases.

11. A gel comprising a nematic liquid crystal, the nematic liquid crystal comprising defect lines formed by an interface in contact with the nematic liquid crystal, wherein the interface comprises a first interface region on one side of the nematic liquid crystal and a second interface region on another side of the nematic liquid crystal, the defect lines extending across the nematic liquid crystal from the first interface region to the second interface region between nucleation sites of the interface for disrupting alignment of the nematic liquid crystal at the interface.

12. The gel as claimed in claim 11, having one or more of:
   a storage modulus as measured by oscillatory rheology of 0.1-$10^5$ Pa; and/or
   a shear thinning index n of 0-40.

13. The gel as claimed in claim 11, wherein the nematic liquid crystal is at least one of a thermotropic nematic liquid crystal, a lyotropic nematic liquid crystal, a liquid crystal polymer, a thermotropic liquid crystal polymer, and a lyotropic liquid crystal polymer.

14. A method for making a system as claimed in claim 1, the method comprising the steps of:
   (a) providing a nematic liquid crystal, and
   (b) providing an interface to be in contact with the nematic liquid crystal, wherein the interface comprises a first interface region on one side of the nematic liquid crystal and a second interface region on another side of the nematic liquid crystal, the interface comprising nucleation sites for disrupting alignment of the nematic liquid crystal at the interface to form defect lines in the nematic crystal extending across the nematic liquid crystal from the first interface region to the second interface region.

15. The method of claim 14, wherein the interface comprises a solid substrate, the method further comprising the step of: providing a surface of the substrate having nucleation structures, wherein the defect lines are pinned to nucleation structures.

16. The method of claim 15, the method further comprising at least one of the steps of:
   (a) roughing the surface of the substrate to provide the nucleation structures;
   (b) chemical patterning the surface of the substrate to provide the nucleation structures, and
   (c) providing particles onto the surface of the substrate to provide the nucleation structures.

17. The method of claim 14, wherein the interface comprises a fluid, the method further comprising the step of: providing particles into the fluid to provide the nucleation sites.

18. A method for making a gel as claimed in claim 11, the method comprising the steps of:
   (a) selecting at least one interface and creating nucleation sites for disrupting alignment of the nematic liquid crystal at the interface to form defect lines extending across the nematic liquid crystal from the first interface region to the second interface region; and
   (b) filling the space between the first interface region and the second interface region with the nematic liquid crystal.

* * * * *